United States Patent
Ma et al.

(10) Patent No.: US 11,318,564 B2
(45) Date of Patent: May 3, 2022

(54) DEVICE AND METHOD FOR ELECTROMAGNETIC INDUCTION HEATING-ASSISTED LASER ADDITIVE MANUFACTURING OF TITANIUM MATRIX COMPOSITE

(71) Applicant: DALIAN UNIVERSITY OF TECHNOLOGY, Dalian (CN)

(72) Inventors: Guangyi Ma, Dalian (CN); Chao Yu, Dalian (CN); Yang Li, Dalian (CN); Aidi He, Dalian (CN); Fangyong Niu, Dalian (CN); Dongjiang Wu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 68 days.

(21) Appl. No.: 16/964,036

(22) PCT Filed: Jan. 6, 2020

(86) PCT No.: PCT/CN2020/070384
§ 371 (c)(1),
(2) Date: Jul. 22, 2020

(87) PCT Pub. No.: WO2020/151484
PCT Pub. Date: Jul. 30, 2020

(65) Prior Publication Data
US 2021/0308805 A1    Oct. 7, 2021

(30) Foreign Application Priority Data

Jan. 24, 2019 (CN) .......................... 201910067776.8

(51) Int. Cl.
*B33Y 30/00*    (2015.01)
*B23K 26/34*    (2014.01)
(Continued)

(52) U.S. Cl.
CPC ............ *B23K 26/702* (2015.10); *B22F 10/28* (2021.01); *B22F 12/222* (2021.01); *B22F 12/41* (2021.01);
(Continued)

(58) Field of Classification Search
CPC .. B23K 26/34–342; B23K 26/03–0344; B22F 12/10–13; B22F 12/22–222;
(Continued)

(56) References Cited

U.S. PATENT DOCUMENTS 5,837,960 A * 11/1998 Lewis ................... B29C 64/153
219/121.63
10,254,499 B1 * 4/2019 Cohen ...................... B23K 1/19
(Continued)

FOREIGN PATENT DOCUMENTS

| CN | 201053029 | 4/2008 |
| CN | 105798299 | 7/2016 |

(Continued)

OTHER PUBLICATIONS

International Search Report dated Mar. 30, 2020 in International (PCT) Application No. PCT/CN2020/070384.
(Continued)

*Primary Examiner* — Michael A Laflame, Jr.
(74) *Attorney, Agent, or Firm* — Wenderoth, Lind & Ponack, L.L.P.

(57) ABSTRACT

The present invention provides a device and method for electromagnetic induction heating-assisted laser additive manufacturing of a titanium matrix composite and belongs to the technical field of laser additive manufacturing. The device includes a coaxial-powder feeding laser deposition system and an electromagnetic induction heating synchronous auxiliary system. The coaxial-powder feeding laser deposition system includes a substrate, a deposition sample,
(Continued)

a laser head and an infrared thermometer. The electromagnetic induction heating synchronous auxiliary system includes an electromagnetic induction power supply auxiliary unit, a coil, a steering heightening mechanism, a driven shaft and a transverse sliding groove. The coil is connected to an output end of the electromagnetic induction power supply auxiliary unit. The coil and the laser head do synchronous movement to implement small-area real-time preheating and slow cooling on the deposition sample.

4 Claims, 3 Drawing Sheets

(51) Int. Cl.

| | |
|---|---|
| *H05B 6/00* | (2006.01) |
| *B22F 12/41* | (2021.01) |
| *B23K 26/70* | (2014.01) |
| *B33Y 10/00* | (2015.01) |
| *B33Y 50/00* | (2015.01) |
| *B23K 26/342* | (2014.01) |
| *B23K 26/60* | (2014.01) |
| *B22F 12/00* | (2021.01) |
| *B22F 12/90* | (2021.01) |
| *B22F 10/28* | (2021.01) |
| *B23K 26/03* | (2006.01) |
| *B23K 26/08* | (2014.01) |
| *H05B 6/10* | (2006.01) |
| *H05B 6/40* | (2006.01) |
| *H05B 6/44* | (2006.01) |
| *B23K 103/14* | (2006.01) |
| *F16H 1/06* | (2006.01) |

(52) U.S. Cl.
CPC ............ *B22F 12/90* (2021.01); *B23K 26/034* (2013.01); *B23K 26/083* (2013.01); *B23K 26/0869* (2013.01); *B23K 26/342* (2015.10); *B23K 26/60* (2015.10); *B33Y 10/00* (2014.12); *B33Y 30/00* (2014.12); *B33Y 50/00* (2014.12); *H05B 6/101* (2013.01); *H05B 6/40* (2013.01); *H05B 6/44* (2013.01); *B22F 2301/205* (2013.01); *B23K 2103/14* (2018.08); *F16H 1/06* (2013.01)

(58) Field of Classification Search
CPC ...... B22F 12/41–43; H05B 6/101–102; B33Y 10/00; B33Y 30/00
See application file for complete search history.

(56) References Cited

U.S. PATENT DOCUMENTS

| | | |
|---|---|---|
| 2008/0219305 A1 | 9/2008 | Aubert et al. |
| 2011/0247188 A1 | 10/2011 | Van Rooyen et al. |
| 2017/0059529 A1 | 3/2017 | Kamel et al. |

FOREIGN PATENT DOCUMENTS

| | | |
|---|---|---|
| CN | 105855544 | 8/2016 |
| CN | 106637200 | 5/2017 |
| CN | 107287588 | 10/2017 |
| CN | 108012358 | 5/2018 |
| CN | 109663917 | 4/2019 |

OTHER PUBLICATIONS

Shaoduan, et al., "Elimination of Laser Direct Forming Crack on DD4 Parts by Induction Heating," Chinese Journal of Lasers, vol. 44, No. 2, pp. 0202003-1 to 0202003-10 (Feb. 2017) with English Abstract and discussed in Specification.

* cited by examiner

DEVICE AND METHOD FOR ELECTROMAGNETIC INDUCTION HEATING-ASSISTED LASER ADDITIVE MANUFACTURING OF TITANIUM MATRIX COMPOSITE

TECHNICAL FIELD

The present invention belongs to the technical field of laser additive manufacturing, is mainly directed to the technical field of coaxial-powder feeding laser additive manufacturing, and particularly relates to a device and method for electromagnetic induction heating-assisted laser additive manufacturing of a titanium matrix composite.

BACKGROUND

At present, a laser additive manufacturing technology is mainly divided into the following two mainstream technologies: powder-laying-based selective laser melting and powder-feeding-based direct laser melting and deposition. However, the samples formed by both of the technologies have large residual stress, resulting in cracking and buckling deformation of the samples. A high cooling rate and an uneven distribution of temperature field in the laser manufacturing technology lead to large residual stress in a part.

Patent CN201711275078.4 reports an electromagnetic induction heating 3D printing system. Coils of various shapes are placed under a substrate to preheat the substrate, which improves the preheating temperature and preheating efficiency. However, it is only directed to preheating the substrate in the selective laser melting technology. As the forming platform descends, since the distance between a top layer and the position of the coils becomes larger, the heating effect is worse, the temperature gradient is larger, and the uniformity of the distribution of temperature field becomes worse.

Patent CN201610284077.5 reports a selective laser melting and electromagnetic induction three-dimensional heating system. A graphite block is arranged between an induction coil and a molding chamber. The induction coil heats the graphite block, and the graphite block transfers the high temperature to the molding chamber, which can realize uniform heating of a surface area, reduce the interlayer temperature gradient and cooling and solidification rates during the processing, and reduce the residual stress in a metal part. However, it cannot realize induction heating in a specific area, and has a large heat-affected zone.

Patent CN201611222037.4 reports a method for preparing a metallic-matrix ceramic coating by using laser cladding assisted by a heat, sound and magnetic complex energy field. A surface of a sample is heated based on electromagnetic induction, but it is difficult to realize synchronous preheating and slow cooling, and synchronous movement along with the changing of a scanning path of a laser head.

Zhang Anfeng of Xi'an Jiaotong University published the article "Elimination of Direct laser forming Crack on DD4 Parts by Induction Heating". After induction heating is added, the temperature gradient and solidification speed are significantly reduced, resulting in significant reduction of thermal stress in a cladding layer. At the same time, the reduction of the solidification speed will release the stress of the cladding layer, such that the liquid in a molten pool will flow more fully, thereby reducing the possibility of generating solidification cracks and basically eliminating the cladding cracks of a DD4 part at 1200° C. However, the device is not suitable for induction heating-assisted direct laser forming of a large-sized part.

SUMMARY

Aiming at the problems existed in the existing method, the present invention provides a device and method for electromagnetic induction heating-assisted laser additive manufacturing of a titanium matrix composite. In the method, a substrate and a deposited layer are preheated synchronously, thereby fully reducing a temperature gradient and reducing the thermal stress in the laser melting deposition process; an area behind a molten pool is cooled slowly to fully release the residual stress in a thermoplastic area and reduce crack defects or cracking tendency; moreover, an infrared thermometer detects the temperature of the molten pool in real time, and temperature-gradient preheating is adopted to reduce the tendency of growing a coarse microstructure; and on-line annealing can also be realized by appropriately increasing a scanning speed and the powder feeding amount, improving a laser deposition efficiency and reducing the burning loss of a low melting point phase.

In order to achieve the above objective, the technical solution adopted by the present invention is as follows.

The present invention discloses a device and method for electromagnetic induction heating-assisted laser additive manufacturing of a titanium matrix composite. The device that implements synchronous movement of a coil and a laser head is as follows.

A substrate 2 is arranged above a machine tool motion platform 1. A surface of the substrate 2 is arranged directly below a laser head 13. A deposition sample 3 is arranged on an upper surface of the substrate 2. The laser head 13 and an infrared thermometer 14 are arranged above the substrate 2. The laser head 13 is fixed on a Y-axis riser plate 10. The infrared thermometer 14 is offset by 30°-60° from a Z axis (in a vertical direction).

The electromagnetic induction heating synchronous auxiliary system includes an electromagnetic induction power supply host 4, an electromagnetic induction power supply auxiliary unit 5, a coil 6, a steering heightening mechanism 7, a driven shaft 8 and a transverse sliding groove 9. The electromagnetic induction power supply host 4 is connected with the electromagnetic induction power supply auxiliary unit 5 through a cable. The electromagnetic induction power supply auxiliary unit 5 is fixed below an external gear ring 16 of the steering heightening mechanism 7. The coil 6 is connected with an output end of the electromagnetic induction power supply auxiliary unit 5. The coil 6 and the laser head 13 do synchronous movement to implement small-area real-time preheating and slow cooling on the deposition sample 3. The transverse sliding groove 9 is fixed on the Y-axis riser plate 10, and an upper end of the driven shaft 8 can move horizontally in the transverse sliding groove 9 to realize on-line heating of a specific area.

The steering heightening mechanism 7 includes a bearing 15, an external gear ring 16, a nut sleeve 17, a shaft coupling 18, a servo motor 19, a pinion 20 and a driving shaft 21. The servo motor 19 is connected with the driving shaft 21 through the shaft coupling 18 to drive the driving shaft 21 to rotate. The driving shaft 21 drives the pinion 20 to rotate. The pinion 20 matched with the driving shaft 21 engages with the external gear ring 16. The external gear ring 16 drives the electromagnetic induction power supply auxiliary unit 5 to turn, thereby realizing fixed-height turning of the coil 6. The external gear ring 16 is in interference fitting with an outer ring of the bearing 15. The bearing 15 is in transition fit with the driven shaft 8. The external gear ring 16 is arranged above the nut sleeve 17. The nut sleeve 17 is in threaded connection with an lower end of the driven shaft 8. The external gear ring 16 moves up and down by rotating the nut sleeve 17.

The coil 6 consists of a magnetizer 22 and a small coil 23, and the small coils are arranged on both of the left and right sides of the coil and symmetrical about a laser spot center 24. One small coil preheats the substrate 2 or the deposition sample 3, and the other small coil slowly cools a solidification area behind the molten pool of the deposition sample 3.

The coil 6 moves synchronously with the laser head 13, such that the heating area is small, the temperature gradient between adjacent deposition layers can be effectively reduced, and the heating uniformity is not limited by the deposition height. The coil 6 is arranged on an upper surface of the deposition sample 3 and is preheated by direct induction, such that heat conduction acts on the deposition layer with a higher preheating efficiency and the laser absorption efficiency in a unit time is improved, compared with the coil 6 being arranged and preheated under the substrate 2. By arranging the coil 6 on the upper surface of the deposition sample 3, appropriately increasing the preheating temperature can fully heat or even melt some convex peaks on the upper surface of the deposition layer, which is conducive to flattening of the surface of the deposition layer. By arranging the coil 6 on the upper surface of the deposition sample 3, one coil slowly cools the area behind the molten pool to fully release the large thermal stress.

By adjusting the output power of the electromagnetic induction power supply host 4 and the distance between the coil 6 and the upper surface of the deposition sample 3, temperature-gradient preheating and slow cooling are realized; and the coil 6 can flexibly turn at a fixed height under the drive of the servo motor 19, and can follow the changing of a scanning path of the laser head 13 under the action of the transverse sliding groove 9 and the steering heightening mechanism 7, so as to realize synchronous electromagnetic induction-assisted laser additive forming of a sample with a complex shape; and adjusting the position of the coil 6 can realize on-line annealing of a specific area of the deposition sample 3.

The present invention discloses a device and method for electromagnetic induction heating-assisted laser additive manufacturing of a titanium matrix composite. The method includes the following steps:

Step one. fixing a polished, cleaned and blow-dried substrate 2 on a machine tool movement platform 1 at a distance of 8-10 mm below a laser head 13, and pouring dried and uniformly-mixed powder into a powder feeder;

Step two. moving a driven shaft 8 and rotating a nut sleeve 17, so that the coil 6 is 1 mm-5 mm away from the upper surface of the substrate 2, and the center of the coil 6 coincides with a laser spot center 24, i.e. the coil 6 being positioned directly below the laser head 13, and then turning on an electromagnetic induction power supply host 4 and an infrared thermometer 14 to preheat the substrate 2, wherein the electromagnetic induction output power is 5 kW-10 kW, and a larger laser line energy density $E=P/V$ corresponds to a smaller electromagnetic induction output power, the electromagnetic induction frequency is 100 KHz-200 KHz, the coil action area is 10 $mm^2$-30 $mm^2$, and the preheating temperature is 400° C.-650° C.;

Step three. setting process parameters (laser power, scanning speed, powder feeding amount, single-layer lifting amount, inter-track overlapping rate, etc.) of the laser additive manufacturing, and turning on a laser 12 such that a laser beam is transmitted along an optical fiber 11 and output from the laser head 13, and the coil 6 and the laser head 13 move synchronously along an X axis to start synchronous electromagnetic induction heating-assisted laser additive manufacturing of a first layer of titanium matrix composite, thereby carry out deposition of a first layer on the surface of the substrate 2;

Step four. when the deposition of the first layer is finished, turning the laser head 13 to move along a Y axis, and driving an external gear ring 16 to rotate 90° through a steering heightening mechanism 7 by a servo motor 19, such that an electromagnetic induction power supply auxiliary unit 5 fixedly connected with the external gear ring 16 also turns 90°, the coil 6 continues to move synchronously along with the laser head 13 to start the melting deposition of a second layer, wherein one small coil 23 in the coil 6 located in front of the laser head 13 preheats the previous layer, the other small coil slowly cools a solidification area behind a molten pool of the deposition sample 3, and the two small coils implements synchronous preheating and slow cooling in tandem all the time, the laser head 13 continues to move according to the above steps while keeping the process parameters of the laser additive manufacturing unchanged, until the laser additive manufacturing of the titanium matrix composite sample is completed, and when the laser head 13 changes the scanning path, the coil 6 still turns according to the above steps to realize synchronous movement with the laser head 13, when the scanning path of the laser head 13 is turned, the coil 6 also rotates by a corresponding angle under the drive of the steering heightening mechanism 7, and the output power of the electromagnetic induction power supply host 4 or the distance between the coil 6 and the deposition sample 3 is changed to realize temperature-gradient varied heating;

Step five. firstly turning off the laser 12, and then turning off the electromagnetic induction power supply host 4, and finally turning off the infrared thermometer 14 after the melting deposition is ended.

The process parameters of the laser additive manufacturing are as follows: the output power P of the laser 12 is 400 W-600 W, the scanning speed V of the laser head 13 is 350 mm/min-500 mm/min, the single-layer descending height of the machine tool movement platform 1 is 0.2 mm-0.6 mm, and the overlapping rate between adjacent tracks is 35%-45%.

As compared with the prior art, the beneficial effects of the present invention are as follows.

The present invention can implement real-time preheating and slow cooling, reduce residual stress and a cracking tendency and improve the mechanical performance of the titanium matrix composite. The electromagnetic induction coil and the laser head do synchronous movement through the steering heightening mechanism to implement synchronous preheating and slow cooling when the laser head makes a complex scanning path and implement real-time small-area preheating and slow cooling on a higher part during laser additive manufacturing. A electromagnetic induction heating device doing synchronous movement with the laser head implements direct and synchronous induction heating of the conductive titanium matrix composite and implements synchronous preheating and slow cooling on the substrate and a deposited layer, thereby reducing the temperature gradient and reducing the thermal stress during the laser additive manufacturing. Slowly cooling the area behind the molten pool enables the residual stress to be fully released in the thermoplastic area, thereby reducing the cracking tendency. Furthermore, temperature-gradient preheating can be adopted to reduce the tendency of growing a coarse microstructure, reduce the burning loss of a low melting point phase, and also realize on-line annealing of any area.

Figure 1:
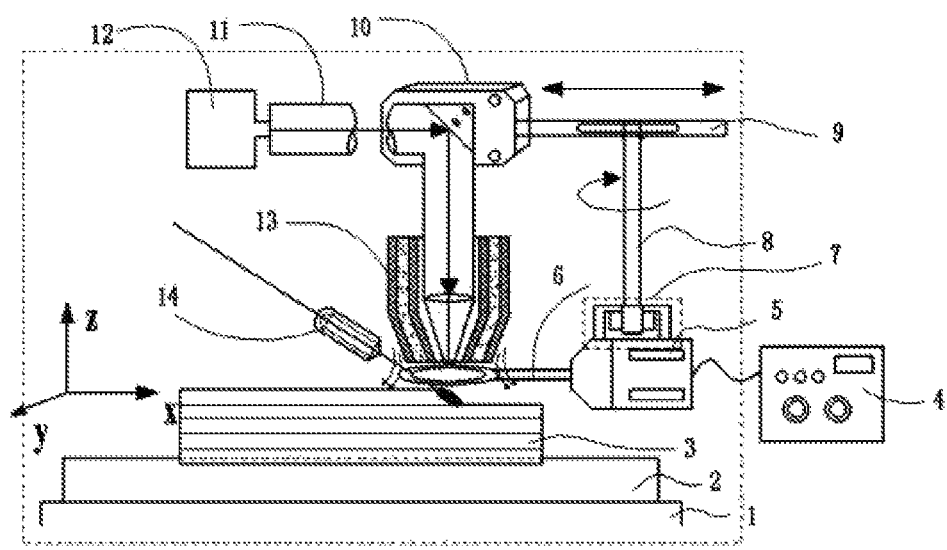
FIG. 1 is a schematic diagram of the mechanism of the present invention.
Figure 2:
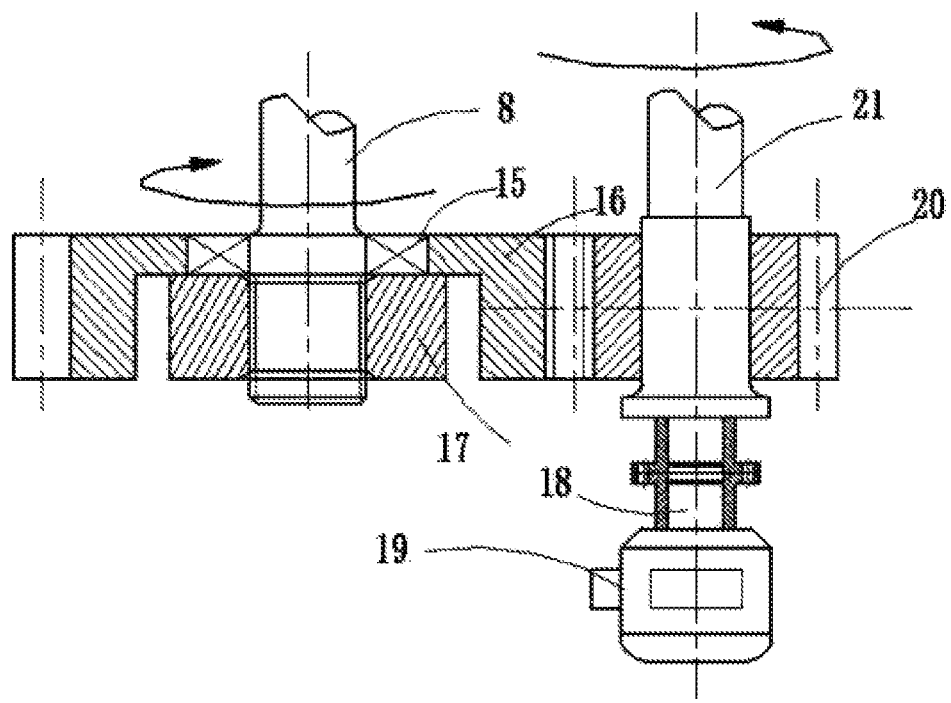
FIG. 2 is a schematic view of a steering heightening mechanism 7 of a coil 6.
Figure 3:
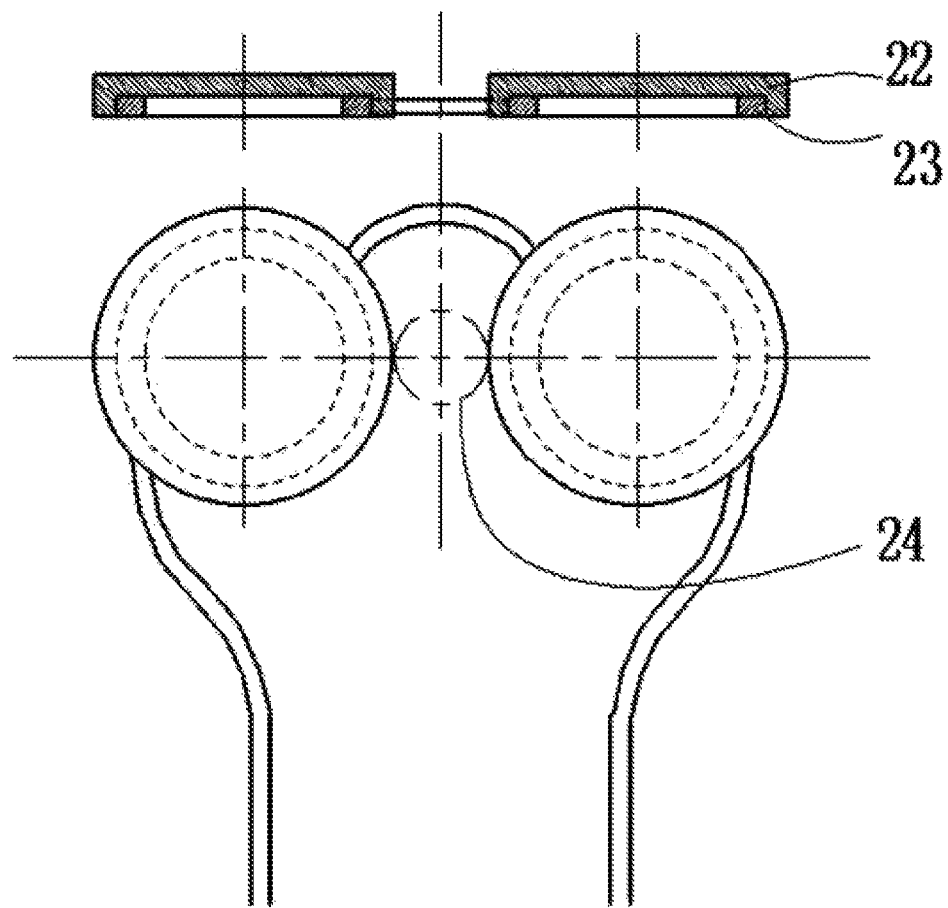
FIG. 3 is a schematic view of the coil 6.

In the figures: 1 refers to a machine tool movement platform; 2 refers to a substrate; 3 refers to a deposition sample; 4 refers to an electromagnetic induction power supply host; 5 refers to an electromagnetic induction power supply auxiliary unit; 6 refers to a coil; 7 refers to a steering heightening mechanism; 8 refers to a driven shaft; 9 refers to a transverse sliding groove; 10 refers to a Y-axis riser plate; 11 refers to an optical fiber; 12 refers to a laser; 13 refers to a laser head; 14 refers to a infrared thermometer; 15 refers to a bearing; 16 refers to an external gear ring; 17 refers to a nut sleeve; 18 refers to a shaft coupling; 19 refers to a servo motor; 20 refers to a pinion; 21 refers to a driving shaft; 22 refers to a magnetizer; 23 refers to a small coil; and 24 refers to a laser spot center.

DESCRIPTION OF THE EMBODIMENTS

The present invention is further described hereafter with reference to the accompanying drawings. Taking electromagnetic-induction-assisted direct laser deposition modelling of a titanium alloy Ti-6Al-4V(TC4) and a titanium carbide TiC titanium matrix composite (TMC) as examples, the following specific embodiments are given.

The present invention discloses a device and method for electromagnetic induction heating-assisted laser additive manufacturing of a titanium matrix composite. The device that implements synchronous movement of a coil and a laser head is as follows.

The electromagnetic induction heating synchronous auxiliary system includes an electromagnetic induction power supply host 4, an electromagnetic induction power supply auxiliary unit 5, a coil 6, a steering heightening mechanism 7, a driven shaft 8 and a transverse sliding groove 9. The electromagnetic induction power supply host 4 is connected with the electromagnetic induction power supply auxiliary unit 5 through a cable. The electromagnetic induction power supply auxiliary unit 5 is fixed below an external gear ring 16 of the steering heightening mechanism 7. The coil 6 is connected with an output end of the electromagnetic induction power supply auxiliary unit 5. The coil 6 and the laser head 13 do synchronous movement to implement small-area real-time preheating and slow cooling on the deposition sample 3. The transverse sliding groove 9 is fixed on the Y-axis riser plate 10, and an upper end of the driven shaft 8 can move horizontally in the transverse sliding groove 9 to realize on-line heating of a specific area.

The steering heightening mechanism 7 includes a bearing 15, an external gear ring 16, a nut sleeve 17, a shaft coupling 18, a servo motor 19, a pinion 20 and a driving shaft 21. The servo motor 19 is connected with the driving shaft 21 through the shaft coupling 18 to drive the driving shaft 21 to rotate. The driving shaft 21 drives the pinion 20 to rotate. The pinion 20 matched with the driving shaft 21 engages with the external gear ring 16. The external gear ring 16 drives the electromagnetic induction power supply auxiliary unit 5 to turn, thereby realizing fixed-height turning of the coil 6. The external gear ring 16 is in interference fitting with an outer ring of the bearing 15. The bearing 15 is in transition fit with the driven shaft 8. The external gear ring 16 is arranged above the nut sleeve 17. The nut sleeve 17 is in threaded connection with a lower end of the driven shaft 8. The external gear ring 16 moves up and down by rotating the nut sleeve 17.

The coil 6 consists of a magnetizer 22 and a small coil 23, and the small coils are arranged on both of the left and right sides of the coil and symmetrical about a laser spot center 24. One small coil preheats the substrate 2 or the deposition sample 3, the other small coil slowly cools a solidification area behind the molten pool of the deposition sample 3, and the two small coils implements synchronous preheating and slow cooling in tandem all the time.

The present invention discloses a device and method for electromagnetic induction heating-assisted laser additive manufacturing of a titanium matrix composite. The method includes the following steps.

Granular TiC powder of 45-90 μm and spherical TC4 powder of 45-90 μm are mechanically and evenly mixed according to a mass fraction of 1:9, dried in a 120° C. drying oven for 4 h, and filled into a powder feeding cylinder.

The substrate 2 is polished with a 400 mesh SiC sandpaper, cleaned with acetone and alcohol, blow-drying the substrate, and fixed onto the machine tool movement platform 1 at a distance of 9 mm from the lower surface of the laser head 13.

The position of the coil 6 is adjusted, so that the center of the coil 6 coincides with the laser spot center 24, the vertical distance between the coil 6 and the substrate 2 is 2 mm, and the included angle between the infrared thermometer 14 and the laser head 13 is 50°.

The process parameters of laser additive manufacturing are set, wherein the laser power P is 450 W, the scanning speed V is 300 mm/min, the single-layer lifting amount is 0.35 mm, the powder feeding amount is 2.0 g/min, the overlapping rate between adjacent tracks is 45%, the electromagnetic induction power supply has an output power of 6 kW and the oscillation frequency is 150 KHz.

The electromagnetic induction power supply host 4 and the infrared thermometer 14 are turned on, and then the laser 12, the powder feeder and the protection gas are turned on when the preheating temperature reaches 600° C., to start multi-pass forming of a multi-layer titanium matrix composite block.

For the first layer, the movement direction of the laser head 13 is along an X direction. After the first layer is deposited, the movement direction of the laser head 13 changes to a Y direction, and the servo motor 19 drives the pinion 20 to rotate. Therefore, the external gear ring rotates 90° since the pinion 20 engages with the external gear ring 16, and the coil 6 is driven to rotate 90°. The machine tool movement platform 1 descends by 0.35 mm. The coil 6 moves along with the laser head 12 in the Y direction to start the synchronous electromagnetic induction-assisted laser deposition forming of a second layer.

For the third layer, the scanning direction of the laser head 13 is along the X direction, the machine tool movement platform 1 descends by 0.35 mm, the coil 6 continues to turn 90° according to the turning principle of the previous step, the coil 6 moves along with the laser head 13 in the X direction, so as to start the synchronous electromagnetic induction-assisted laser deposition forming of the third layer. The scanning path of the laser head 13 is bidirectional cross scanning. That is, an odd layer is scanned along the X direction, and an even layer is scanned along the Y direction. The coil 6 turns along with the change of the scanning direction of the laser head 13.

After the 20th layer is deposited, due to the continuous accumulation of heat, the output power of the electromagnetic induction power supply host 4 is adjusted to 6 kW or the distance between the coil 6 and the deposition sample 3 is adjusted to 3 mm, so that the preheating temperature is 500° C., and the deposition forming is continuously scanned according to the bidirectional and crossing path.

After the 40th layer is deposited, due to the continuous accumulation of heat, the output power of the electromagnetic induction power supply host 4 is adjusted to 5 kW or the distance between the coil 6 and the deposition sample 3 is adjusted to 4 mm, so that the preheating temperature is 400° C., and the deposition forming is continuously scanned according to the bidirectional and crossing path.

After a predetermined number of scanning layers is reached, the machine tool movement platform 1 stops moving, and the laser 12 is firstly turned off, then the electromagnetic induction power supply host 4 is turned off, and finally the infrared thermometer 14 is turned off.

If on-line annealing of the upper surface of the deposition sample 3 or the annealing treatment of a specific area will be conducted at a later stage, the laser head 13 is removed, the horizontal position of the driven shaft 8 in the transverse sliding groove 9 is adjusted, and the position and height of the coil 6 are adjusted by the steering heightening mechanism 7. The electromagnetic induction power supply host 4 is turned on, the output power is set, the infrared thermometer 14 is turned on to monitor the heating temperature, and then on-line annealing of the upper surface of the deposition sample 3 or the annealing treatment of the specific area is conducted.

The aforementioned embodiments merely represent implementation of the present invention, and should be understood as limiting the invention scope of the present invention. It should be noted that, several improvements and modifications can be made by those of ordinary skills in the art without departing from the conception of the present invention. These modifications and improvements all fall within the claimed scope of the present invention.

What is claimed is:

1. A device for electromagnetic induction heating-assisted laser additive manufacturing of a titanium matrix composite, wherein the device can realize synchronous movement of a coil and a laser head, and the device is as follows:

the electromagnetic induction heating synchronous auxiliary system comprises an electromagnetic induction power supply host (4), an electromagnetic induction power supply auxiliary unit (5), a coil (6), a steering heightening mechanism (7), a driven shaft (8) and a transverse sliding groove (9); the electromagnetic induction power supply host (4) is connected with the electromagnetic induction power supply auxiliary unit (5), the electromagnetic induction power supply auxiliary unit (5) is fixed below an external gear ring (16) of the steering heightening mechanism (7), the coil (6) is connected with an output end of the electromagnetic induction power supply auxiliary unit (5), the coil (6) and the laser head (13) do synchronous movement through the steering heightening mechanism (7), so as to implement small-area real-time preheating and slow cooling on a deposition sample (3), the transverse sliding groove (9) is fixed on a Y-axis riser plate (10), and an upper end of the driven shaft (8) can move horizontally in the transverse sliding groove (9) to realize on-line heating of a specific area;

the steering heightening mechanism (7) comprises a bearing (15), an external gear ring (16), a nut sleeve (17), a shaft coupling (18), a servo motor (19), a pinion (20) and a driving shaft (21), the servo motor (19) is connected with the driving shaft (21) through the shaft coupling (18) to drive the driving shaft (21) to rotate, the driving shaft (21) drives the pinion (20) to rotate, the pinion (20) matched with the driving shaft (21) engages with the external gear ring (16), and the external gear ring (16) drives the electromagnetic induction power supply auxiliary unit (5) to turn, that is, the coil (6) can flexibly turn at a fixed height under the drive of the servo motor (19), and can follow the changing of a scanning path of the laser head (13) under the action of the transverse sliding groove (9) and the steering heightening mechanism (7), so as to realize synchronous electromagnetic induction-assisted laser additive forming of a sample with a complex shape, and adjusting the position of the coil (6) can realize on-line annealing of a specific area of the deposition sample (3);

the external gear ring (16) is in interference fitting with an outer ring of the bearing (15), the bearing (15) is in transition fit with the driven shaft (8), the external gear ring (16) is arranged above the nut sleeve (17), the nut sleeve (17) is in threaded connection with a lower end of the driven shaft (8), and the external gear ring (16) moves up and down by rotating the nut sleeve (17);

the coil (6) consists of a magnetizer (22) and a small coil (23), and the small coils are arranged on both of the left and right sides of the coil and symmetrical about a laser spot center (24), one small coil preheats the substrate (2) or the deposition sample (3), the other small coil slowly cools a solidification area behind the molten pool of the deposition sample (3), and the two small coils implements synchronous preheating and slow cooling in tandem all the time; by adjusting the output power of the electromagnetic induction power supply host (4) and the distance between the coil (6) and the upper surface of the deposition sample (3), temperature-gradient preheating of the substrate and the deposited layer and temperature-gradient slow cooling of the area behind the molten pool are realized.

2. A method for electromagnetic induction heating-assisted laser additive manufacturing of a titanium matrix composite by using the device according to claim 1, comprising the following steps:

Step one. fixing a polished, cleaned and air-dried substrate (2) on a machine tool movement platform (1) at a distance of 8-10 mm just below a laser head (13), and pouring dried and uniformly-mixed powder into a powder feeder;

Step two. moving a driven shaft (8) and rotating a nut sleeve (17), so that the coil (6) is 1 mm-5 mm away from the upper surface of the substrate (2), and the center of the coil (6) coincides with a laser spot center (24), and then turning on an electromagnetic induction power supply host (4) and an infrared thermometer (14) to preheat the substrate (2), wherein the electromagnetic induction output power is 5 kW-10 kW, the electromagnetic induction frequency is 100 KHz-200 KHz, the coil action area is 10 $mm^2$-30 $mm^2$, and the preheating temperature is 400° C.-650° C.;

Step three. setting process parameters of the laser additive manufacturing, and turning on a laser (12) such that the coil (6) and the laser head (13) move synchronously along an X axis to start synchronous electromagnetic induction heating-assisted laser additive manufacturing of a first layer of titanium matrix composite, thereby carry out deposition of a first layer;

Step four. when the deposition of the first layer is finished, turning the laser head (13) to move along a Y axis, and driving an external gear ring (16) to rotate 90° through a steering heightening mechanism (7) by a servo motor (19), such that an electromagnetic induction power supply auxiliary unit (5) fixedly connected with the external gear ring (16) also turns 90°, the coil (6) continues to move synchronously along with the laser head (13) to start the melting deposition of a second layer, wherein one small coil (23) in the coil (6) located in front of the laser head (13) preheats the previous layer, and the other small coil slowly cools a solidification area behind a molten pool of the deposition sample (3), the laser head (13) continues to move according to the steps described in step three and the first paragraph of Step four while keeping the process parameters of the laser additive manufacturing unchanged, until the laser additive manufacturing of the titanium matrix composite sample is completed, and when the laser head (13) changes the scanning path, the coil (6) still turns according to the steps described in the first paragraph of Step four to realize synchronous movement with the laser head (13), when the scanning path of the laser head (13) is turned, the coil (6) also rotates by a corresponding angle under the drive of the steering heightening mechanism (7), and the output power of the electromagnetic induction power supply host (4) or the distance between the coil (6) and the deposition sample (3) is changed to realize temperature-gradient varied heating;

Step five. firstly turning off the laser (12), and then turning off the electromagnetic induction power supply host (4), and finally turning off the infrared thermometer (14) after the melting deposition is ended.

3. The method according to claim 2, wherein the process parameters of the laser additive manufacturing comprises laser power, a scanning speed, powder feeding amount, single-layer lifting amount and inter-track overlapping rate, and specifically are: the output power P of the laser (12) is 400 W-600 W, the scanning speed V of the laser head (13) is 350 mm/min-500 mm/min, the powder feeding amount is 1.5 g/min-4 g/min, the single-layer descending height of the machine tool movement platform (1) is 0.2 mm-0.6 mm, and the overlapping rate between adjacent tracks is 35%-45%.

4. The method according to claim 2, wherein the infrared thermometer (14) is offset by 30°-60° from the laser head (13).

* * * * *